United States Patent
Nias et al.

(10) Patent No.: US 9,028,165 B2
(45) Date of Patent: May 12, 2015

(54) TOLERANCE RING WITH PERFORATED WAVES

(71) Applicants: Benjamin Nias, Patchway (GB); Andrew Robert Slayne, Frampton Cotterell (GB); Simon Alan Hughes, Pembrokeshire (GB); Neil James, Newport (GB)

(72) Inventors: Benjamin Nias, Patchway (GB); Andrew Robert Slayne, Frampton Cotterell (GB); Simon Alan Hughes, Pembrokeshire (GB); Neil James, Newport (GB)

(73) Assignee: Saint-Gobain Performance Plastics Rencol Limited, Binley Business Park, Coventry ( * ) Notice: Subject to any disclaimer, the term of this patent is extended or adjusted under 35 U.S.C. 154(b) by 0 days.

(21) Appl. No.: 13/874,442

(22) Filed: Apr. 30, 2013

(65) Prior Publication Data

US 2013/0315654 A1    Nov. 28, 2013

Related U.S. Application Data

(60) Provisional application No. 61/640,620, filed on Apr. 30, 2012.

(51) Int. Cl.
| | |
|---|---|
| *F16C 27/00* | (2006.01) |
| *G11B 5/48* | (2006.01) |
| *F16D 1/08* | (2006.01) |
| *F16C 27/04* | (2006.01) |

(Continued)

(52) U.S. Cl.
CPC ............ *G11B 5/4813* (2013.01); *F16D 1/0835* (2013.01); *F16C 27/04* (2013.01); *G11B 5/5569* (2013.01); *F16C 11/04* (2013.01)

(58) Field of Classification Search
CPC .... F16C 2326/24; F16C 27/02; F16C 35/077; F16C 35/073; F16C 2370/12; B62D 1/16; F16D 1/0835; G11B 5/4813
USPC .................. 403/367, 371, 372; 411/520, 521; 360/97.02, 265.2, 265.6, 266.1
See application file for complete search history.

(56) References Cited

U.S. PATENT DOCUMENTS

| | | | |
|---|---|---|---|
| 791,059 | A | 5/1905 | Wormer |
| 2,348,862 | A | 5/1944 | Sorkin |

(Continued)

FOREIGN PATENT DOCUMENTS

| | | |
|---|---|---|
| CA | 2736810 A1 | 3/2010 |
| CN | 101583997 A | 11/2009 |

(Continued)

OTHER PUBLICATIONS

International Search Report from PCT Application No. PCT/GB2013/051116, dated Jul. 4, 2013, 1 pg.

(Continued)

*Primary Examiner* — Joshua Kennedy
(74) *Attorney, Agent, or Firm* — Chi Suk Kim; Abel Law Group, LLP

(57) ABSTRACT

A tolerance ring can include a generally cylindrical body that can include a side wall. The sidewall can define a top and a bottom. Further, the sidewall can include a plurality of wave structures that can extend from the sidewall, a plurality of unformed sections, and a gap that can extend along the entire length of the body. Each unformed section can be located between a pair of adjacent wave structures. Further, the gap can establish a split in the body. The tolerance ring can also include at least one hole intersecting at least one of the wave structures to establish a perforated wave structure.

20 Claims, 11 Drawing Sheets

(51) Int. Cl.
    *G11B 5/55*     (2006.01)
    *F16C 11/04*    (2006.01)

(56)  References Cited

U.S. PATENT DOCUMENTS

| | | | |
|---|---|---|---|
| 2,813,765 A | 11/1957 | Alward | |
| 2,978,227 A | 4/1961 | Hess | |
| 3,420,537 A | 1/1969 | Walters | |
| 3,700,271 A | 10/1972 | Blaurock et al. | |
| 3,838,928 A | 10/1974 | Blaurock et al. | |
| 4,083,622 A * | 4/1978 | Neidecker | 439/86 |
| 4,286,894 A | 9/1981 | Rongley | |
| 4,384,626 A | 5/1983 | Derouin | |
| 4,848,935 A | 7/1989 | Seibig et al. | |
| 4,981,390 A | 1/1991 | Cramer, Jr. et al. | |
| 5,125,755 A | 6/1992 | Adler et al. | |
| 5,575,691 A * | 11/1996 | Matthews | 439/744 |
| 5,704,762 A | 1/1998 | Schultze | |
| 6,179,473 B1 | 1/2001 | Ponson et al. | |
| 6,416,229 B1 | 7/2002 | Wolf | |
| 6,846,110 B2 | 1/2005 | Lutz et al. | |
| 7,583,476 B2 | 9/2009 | Hanrahan et al. | |
| 7,850,389 B2 | 12/2010 | Hanrahan et al. | |
| 7,978,437 B2 | 7/2011 | Hanrahan et al. | |
| 8,157,450 B2 * | 4/2012 | Hosmer et al. | 384/535 |
| 8,282,308 B2 * | 10/2012 | Slayne et al. | 403/372 |
| 2006/0012133 A1 | 1/2006 | Strait | |
| 2006/0012134 A1 | 1/2006 | Rode et al. | |
| 2007/0096588 A1 | 5/2007 | Kirchner | |
| 2007/0274772 A1 | 11/2007 | Tiberghien et al. | |
| 2008/0029356 A1 | 2/2008 | Halasy-Wimmer et al. | |
| 2008/0043374 A1 | 2/2008 | Hanrahan et al. | |
| 2008/0049362 A1 | 2/2008 | Hanrahan et al. | |
| 2009/0064536 A1 | 3/2009 | Klassen et al. | |
| 2009/0258714 A1 | 10/2009 | Rode et al. | |
| 2009/0258715 A1 | 10/2009 | Rode et al. | |
| 2009/0296282 A1 | 12/2009 | Hanrahan et al. | |
| 2010/0032577 A1 | 2/2010 | Fruehauf et al. | |
| 2010/0073820 A1 | 3/2010 | Slayne et al. | |
| 2012/0087044 A1 * | 4/2012 | Schmidt et al. | 360/265.6 |
| 2013/0028732 A1 * | 1/2013 | Golovatai-Schmidt et al. | 415/229 |
| 2015/0000098 A1 * | 1/2015 | Slayne et al. | 29/428 |

FOREIGN PATENT DOCUMENTS

| | | | | |
|---|---|---|---|---|
| DE | 3704572 | A1 | 8/1988 | |
| DE | 4230965 | A1 | 3/1994 | |
| DE | 29680093 | U1 | 2/1997 | |
| DE | 19922914 | A1 | 11/2000 | |
| DE | 102008028371 | A1 | 12/2009 | |
| DE | 102011077361 | A1 * | 12/2012 | |
| EP | 1408247 | B1 | 8/2006 | |
| EP | 1498911 | B1 | 10/2008 | |
| EP | 1985875 | A1 | 10/2008 | |
| EP | 2054885 | B1 | 2/2011 | |
| FR | 2627620 | A3 | 8/1989 | |
| GB | 2173867 | A | 10/1986 | |
| GB | 2298005 | A | 8/1996 | |
| GB | 2413594 | A | 11/2005 | |
| JP | 0392610 | A | 4/1991 | |
| JP | 03092610 | A * | 4/1991 | F16B 7/04 |
| JP | 2002-130266 | A | 5/2002 | |
| JP | 2002-130310 | A | 5/2002 | |
| JP | 2002130310 | A * | 5/2002 | |
| JP | 2012-052638 | A | 3/2012 | |
| RU | 2389913 | C1 | 5/2010 | |
| WO | 96/25607 | A1 | 8/1996 | |
| WO | 03/010441 | A1 | 2/2003 | |
| WO | 2008/021890 | A2 | 2/2008 | |
| WO | 2008/024687 | A2 | 2/2008 | |
| WO | 2009/030017 | A1 | 3/2009 | |
| WO | 2013164607 | A1 | 11/2013 | |
| WO | 2013164608 | A1 | 11/2013 | |

OTHER PUBLICATIONS

International Search Report from PCT Application No. PCT/GB2013/051117, dated Jul. 4, 2013, 1 pg.

U.S. Appl. No. 13/874,443, filed Apr. 30, 2013, 38 pgs.

* cited by examiner

TOLERANCE RING WITH PERFORATED WAVES

This application claims priority to and the benefit of U.S. Provisional Patent Application No. 61/640,620, which was filed on Apr. 30, 2012, and is incorporated herein by reference in its entirety.

BACKGROUND OF THE INVENTION

1. Field of the Disclosure

The present disclosure is directed to tolerance rings, particularly to tolerance rings for actuator arms within hard disk drives.

2. Description of the Related Art

This invention relates to tolerance ring assemblies, wherein a tolerance ring provides an interference fit between parts of an assembly, where a first part has a cylindrical portion located in a cylindrical bore of a second part. The invention particularly relates to assemblies having a tolerance ring that provides an interference fit between a cylindrical component such as a shaft or a bearing and a housing for the shaft.

Improved engineering techniques have resulted in the need for greater accuracy of machine parts, raising manufacturing costs. Very close tolerances are required where press fits, splines, pins or keyways are employed to transmit torque in applications such as pulleys, flywheels or driveshafts.

Tolerance rings may be used to provide an interference fit between parts required to transmit torque. Tolerance rings provide a low cost means of providing an interference fit between parts that may not be machined to exact dimensions. Tolerance rings have a number of other potential advantages, such as compensating for different linear coefficients of expansion between the parts, allowing rapid apparatus assembly, and durability.

A tolerance ring generally comprises a strip of resilient material, for example a metal such as spring steel, the ends of which are brought together to form a ring. A band of protrusions extend radially outwards from the ring, or radially inwards towards the center of the ring. Usually, the protrusions are formations, possibly regular formations, such as corrugations, ridges or waves.

When the ring is located in the annular space between, for example, a shaft and a bore in a housing in which the shaft is located, the protrusions are compressed. Each protrusion acts as a spring and exerts a radial force against the shaft and the surface of the bore, providing an interference fit between the shaft and the housing. Rotation of the housing or the shaft will produce similar rotation in the other of the shaft or the housing, as torque is transmitted by the tolerance ring. Typically, the band of protrusions is axially flanked by annular regions of the ring that have no formations (known in the art as "unformed regions" of the tolerance ring).

Although tolerance rings usually comprise a strip of resilient material that is curved to allow the easy formation of a ring by overlapping the ends of the strip, a tolerance ring may also be manufactured as an annular band. The term "tolerance ring" as used hereafter includes both types of tolerance ring. The term "shaft" as used hereafter includes any assembly component with a cylindrical portion, such as a shaft or a bearing.

Accordingly, the industry continues to need improvements in tolerance rings, particularly tolerance rings installed within hard disk drives.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION

The following description is directed to tolerance rings, and particularly, to tolerance rings that can be installed within a hard disk drive between a pivot and a bore formed in an actuator arm. In one aspect, a tolerance ring can be fitted around the pivot and then this pivot ring assembly can be inserted into the bore. Alternatively, the tolerance ring can be inserted into the bore and the pivot can be inserted into the tolerance ring.

In a typical tolerance ring, the waves nearest to the gap tend to be the weakest, i.e., least stiff, since the waves have a gap on one side and material on the other and the remaining waves in the tolerance ring are flanked by material on both sides. This variation in stiffness can cause performance variables, e.g., resonance and alignment, to be very dependent on a position of the gap in the hard disk drive assembly. Attempting to optimize the gap location for one performance parameter can adversely affect other performance parameters. This, in turn, can compromise overall performance.

A tolerance ring according to one or more of the embodiments described herein can include a plurality of holes, or perforations, that extend through the sidewall of the tolerance ring at targeted locations on the tolerance ring in order to impart controlled weaknesses in one or more waves. For example, a single hole can pass through two adjacent waves and can remove a shoulder portion of each wave. Removing the shoulder portion of a wave can reduce the stiffness of the wave since the shoulder is a strengthening feature of the wave.

The perforated tolerance rings disclosed herein can provide a tolerance ring having a resonant frequency and stiffness that do not substantially vary circumferentially around the tolerance ring. As such, the tolerance ring can maintain the post in alignment within the bore and can substantially prevent any rocking of the post within the bore under normal operational loads in nearly any radial direction.

Figure 1:
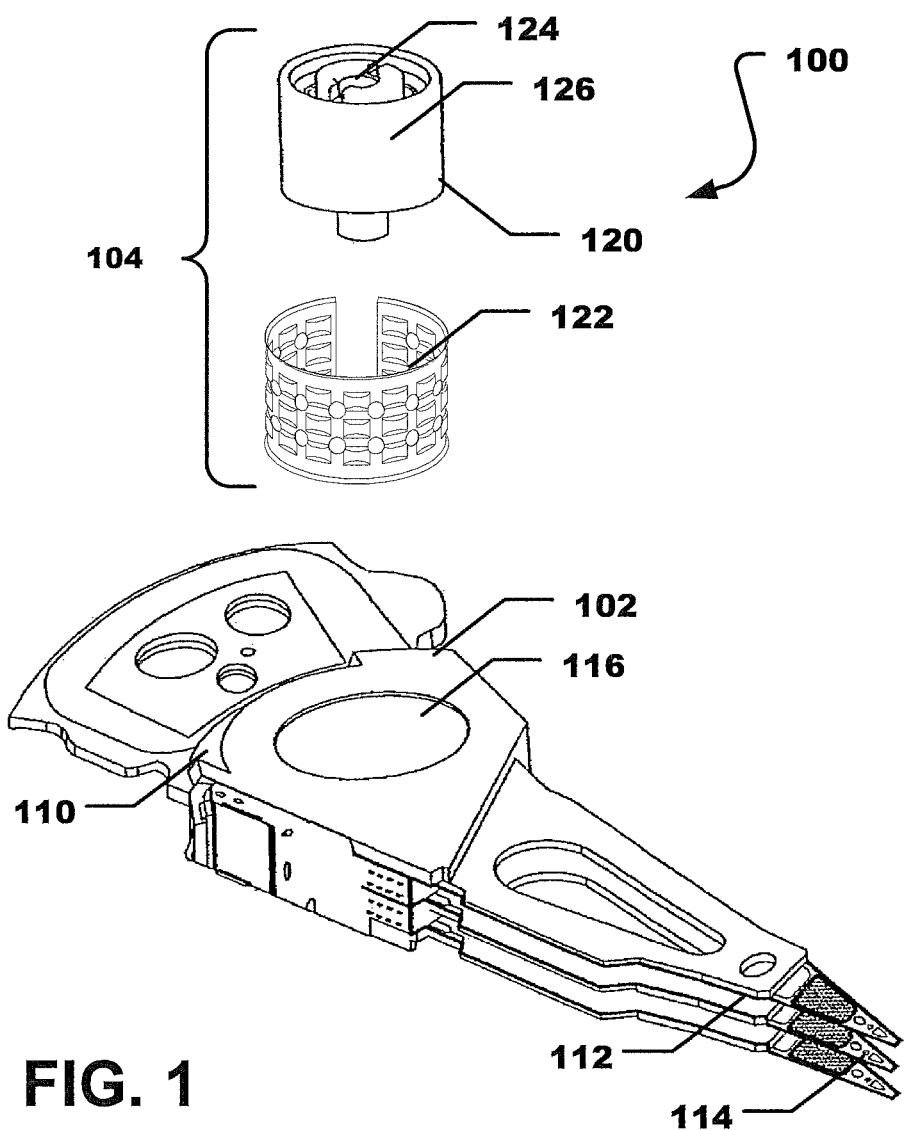
FIG. 1 includes an exploded perspective view of a hard disk drive assembly in accordance with an embodiment.

Referring initially to FIG. 1, a hard disk drive assembly is shown and is generally designated 100. The hard disk drive assembly 100 can include an actuator arm 102 for a hard disk drive and a pivot assembly 104.

As illustrated, the actuator arm 102 can include a proximal end 110 and a distal end 112. A plurality of read/write heads 114 can extend from the distal end 112 of the actuator arm 102. Moreover, the actuator arm 102 can be formed with a bore 116 near the proximal end 110 of the actuator arm 102.

FIG. 1 further indicates that the pivot assembly 104 can include a pivot 120 and a tolerance ring 122. The pivot 120 can include an inner member 124 and an outer member 126 and the outer member 126 can rotate with respect to the inner member 124.

In a particular aspect, the tolerance ring 122 can fit around the pivot 120 and then, the pivot assembly 104 can be installed within the bore 116. In another aspect, the tolerance ring 122 can be placed within the bore 116 and the pivot 120 can be inserted into the tolerance ring 122. The tolerance ring 122 can establish an interference fit between the outer member 126 of the pivot 120 and the bore 116 of the actuator arm 102. As such, the actuator arm 102 can rotate with the outer member 126 of the pivot 120 around the inner member 124 of the pivot 120.

Figure 2:
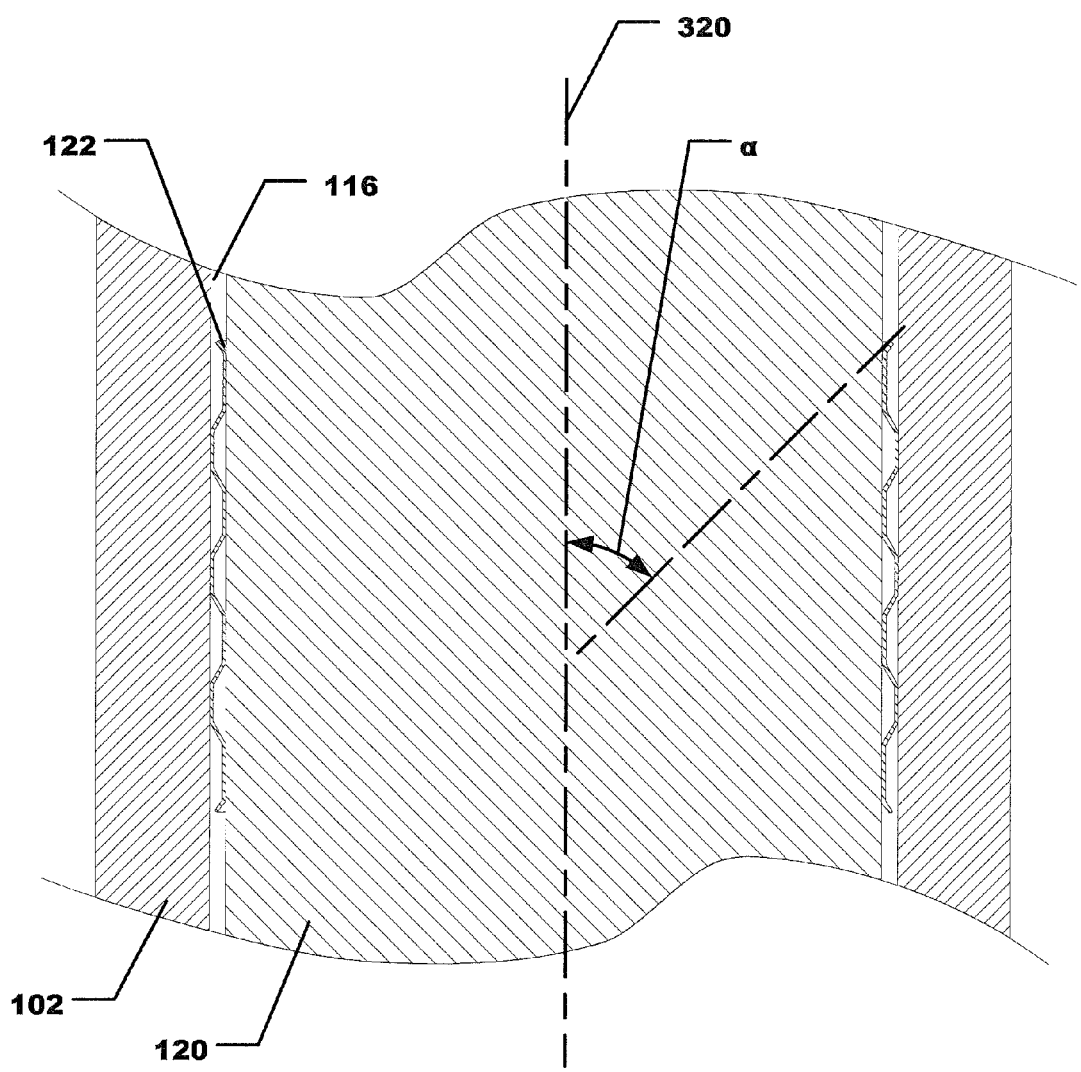
FIG. 2 includes a cross-sectional view of a hard disk drive assembly in accordance with an embodiment.

Accordingly, as shown in FIG. 2, the tolerance ring 122 can be installed within the bore 116 between an outer component, the actuator arm 102, and an inner component, the pivot 120. In a particular aspect, when installed, no portion of the tolerance ring 122 extends beyond the top or bottom of the bore and the tolerance ring 122 can be completely contained within the bore 116. In another aspect, a portion of the tolerance ring 122, e.g., a top, a bottom, a structure on a top, a structure on a bottom, or a combination thereof, can extend from the bore.

As illustrated in FIG. 2, and described in greater detail below, the tolerance ring 122 can be configured to engage the inner wall of the bore 116 and the outer wall of the pivot 120 in order to maintain the pivot 120 within the actuator arm 102 in an interference fit. The tolerance ring 122 can account for dimensional variations by expanding around the pivot 120 as it is installed thereon and then, at least partially deforming, or compressing, within the bore 116 during installation.

Figure 3:
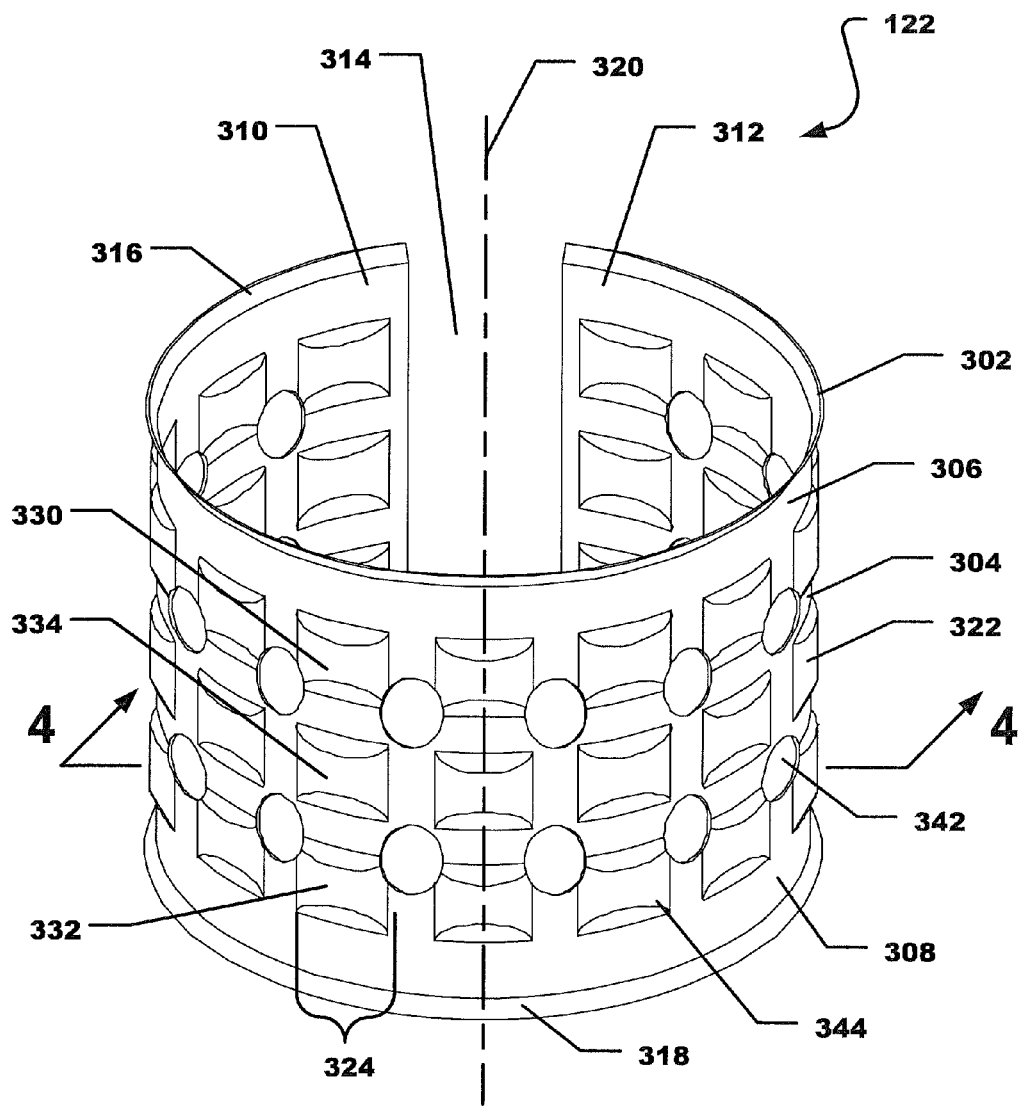
FIG. 3 includes a perspective view of a tolerance ring in accordance with an embodiment.
Figure 4:
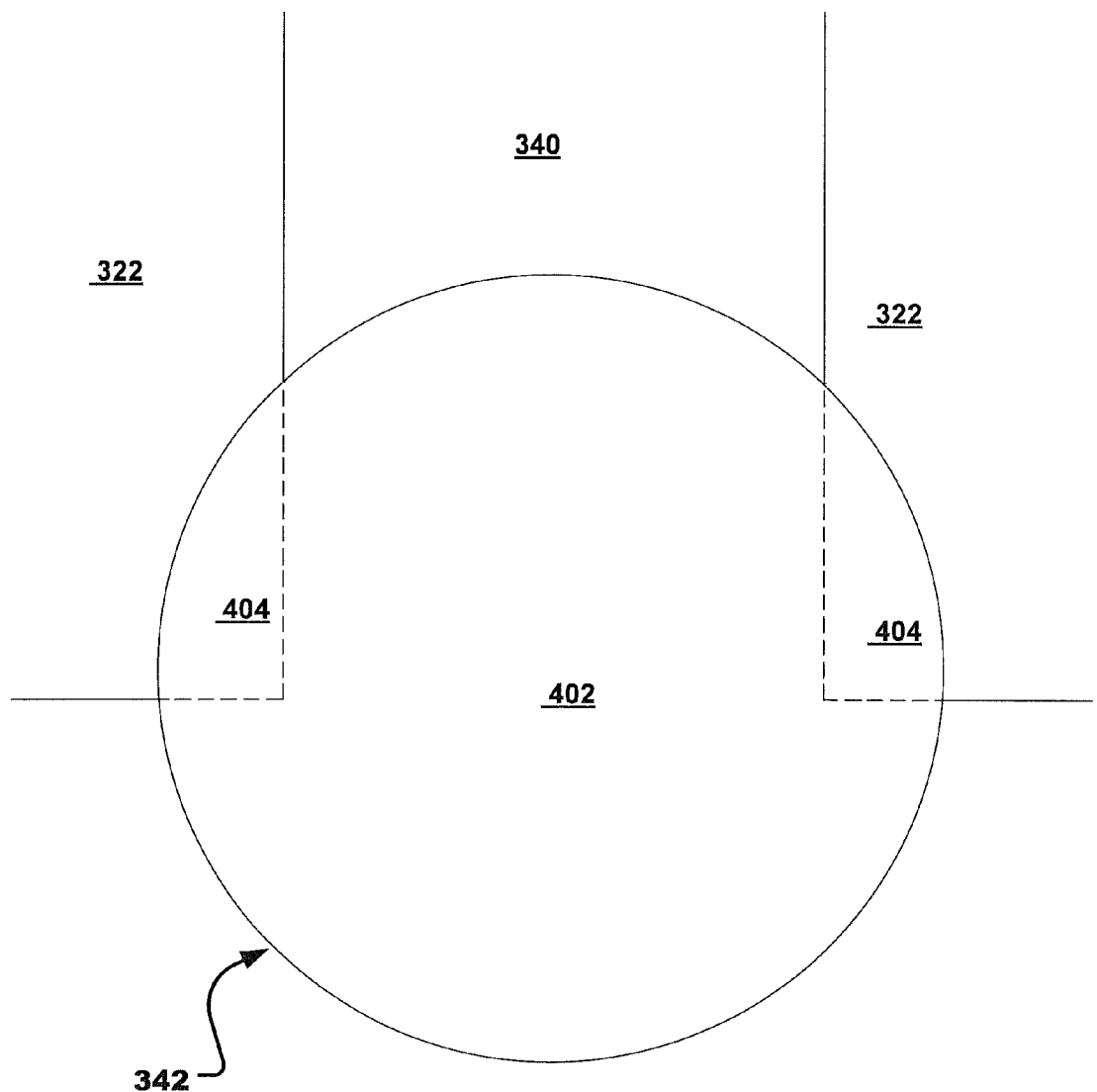
FIG. 4 includes a cross-sectional view of a tolerance ring in accordance with an embodiment taken along Line 4-4 in FIG. 3.
Figure 5:
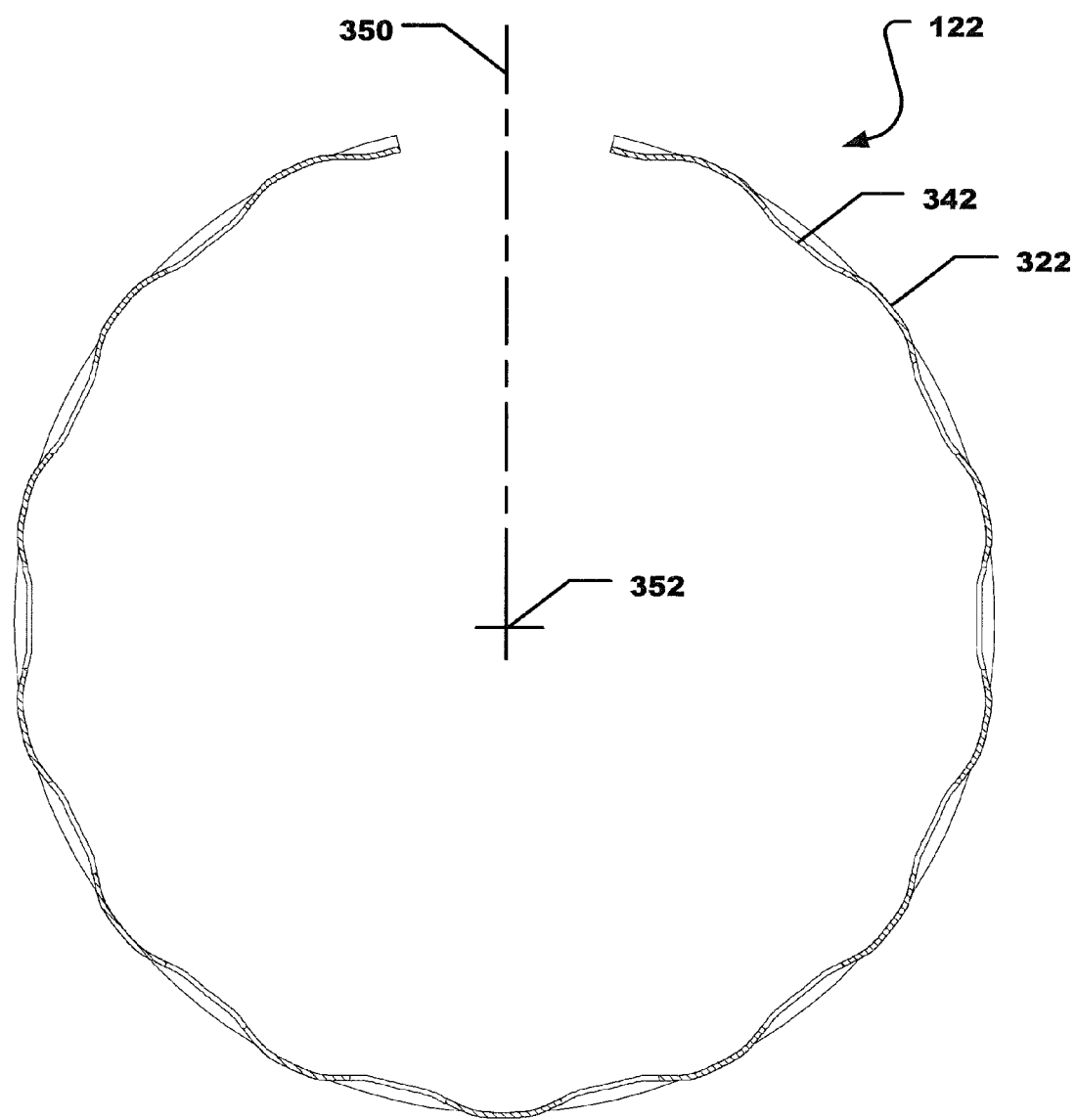
FIG. 5 includes a detailed view of a tolerance ring in accordance with an embodiment.

Referring now to FIG. 3, FIG. 4, and FIG. 5, details concerning the tolerance ring 122 are illustrated. As depicted, the tolerance ring 122 can include a generally cylindrical body 302 having a generally cylindrical sidewall 304. The sidewall 304 can include a top 306 and a bottom 308. Further, the sidewall 304 can include a first end 310 and a second end 312. Moreover, a gap 314 can be established between the first end 310 and the second end 312 of the sidewall 304. The gap 314 can extend along the entire length of the body 302 and the gap 314 can establish a split in the body 302.

As indicated in FIG. 3, the body 302 of the tolerance ring 122 can further include an upper flange 316 extending from the top 306 of the sidewall 304 and a lower flange 318 extending from the bottom 308 of the sidewall 304.

The tolerance ring 122 can include a central axis 320 and as shown in FIG. 2 and FIG. 3, in a particular aspect, the flanges 316, 318 can be angled in an outward direction with respect to the central axis 320 of the tolerance ring 122. It is to be understood that the flanges 316, 318 can be angled in an inward direction with respect to the central axis 320. In either case, the flanges 316, 318 can form an angle, α, with respect the central axis 320. In a particular aspect, α can be ≥5°, such as ≥10°, or ≥15°. In another aspect, α can be ≤30°, such as ≤25°, or ≤20°. In another aspect, α can be within a range between, and including, any of the values disclosed above.

As most clearly illustrated in FIG. 2, the tolerance ring 122 may include an overall wall thickness, $t_{OW}$, that is the distance between the inner surface of the sidewall 304 of the tolerance ring 122 and an outer surface of a wall structure formed in the sidewall 304 of the tolerance ring 122. Further, each flange 316, 318 can extend from the sidewall 304 such that each flange 316, 318 has an overall flange thickness, $t_{OF}$, that is the distance between the inner surface of the sidewall 304 of the tolerance ring 122 and the outer edge of the flange 316, 318. In a particular aspect, $t_{OF}$ can be ≥30% $t_{OW}$, such as ≥35% $t_{OW}$, ≥40% $t_{OW}$, ≥45% $t_{OW}$, ≥50% $t_{OW}$, ≥55% $t_{OW}$, or ≥60% $t_{OW}$. Further, $t_{OF}$ can be ≤98% $t_{OW}$, such as ≤95% $t_{OW}$, ≤90% $t_{OW}$, ≤85% $t_{OW}$, or ≤80% $t_{OW}$. In another aspect, $t_{OF}$ can be within a range between, and including, any of the percentage values of $t_{OW}$ disclosed above.

In certain embodiments that include flanges and wall structures that extend in an inward direction relative to the central axis 320, $t_{OW}$ can be measured between an outer surface of the sidewall 304 of the tolerance ring 122 and an inner surface of a wall structure formed in the sidewall 304 of the tolerance ring 122. Further, in such embodiments, $t_{OF}$ is measured between the outer surface of the sidewall 304 of the tolerance ring 122 and the inner edge of the flange 316, 318.

Still referring to FIG. 2 and FIG. 3, the tolerance ring 122 can include a plurality of waves 322 formed in the sidewall 304 of the body 302. As illustrated, in one aspect, the waves 322 can extend in an outward direction with respect to the central axis 320. However, in another aspect, the waves 322 can extend in an inward direction with respect to the central axis 320.

The waves 322 can be formed, or otherwise arranged, in the sidewall 304 of the body 302 so that the tolerance ring 122 includes a plurality of wave structures, such as wave columns 324 that are equally spaced around the circumference of the sidewall 302 of the body 304 of the tolerance ring 122.

Each wave column 324 can include at least two waves 322 vertically aligned with each other along the sidewall 304 of the body 302 of the tolerance ring 122, e.g., along a length of the tolerance ring 122.

As illustrated in FIG. 3, in a particular aspect, each wave column 324 the tolerance ring 122 can a first wave 330 near the top 306 of the sidewall 304 of the body 302 of the tolerance ring 122 and a second wave 332 near the bottom 308 of the sidewall 304 of the body 302 of the tolerance ring 122. In a particular aspect, the first wave 330 can be centered within the top half of the length of the tolerance ring 122. Moreover, the second wave 332 can be centered within the bottom half of the length of the tolerance ring 122. Each wave column 324 can also include a third wave 334 between the first wave 330 and the second wave 332. The third wave 334 can be centered along the length of the tolerance ring 122.

In one aspect, the first wave 330 can be the same size as the second wave 332, e.g., length, width, height (measured from the outer surface of the sidewall 304). In another aspect, the first wave 330, the second wave 332, and the third wave 334 are the same size, e.g., length, width, height (measured from the outer surface of the sidewall 304). In particular, the first wave 330 and the second wave 332 can have a first length, $L_1$, and the third wave 334 includes a second length, $L_2$, and $L_2 \leq L_1$. Specifically, $L_2$ can be ≤75% $L_1$, such as $L_2 \leq 70\% L_1$, $L_2 \leq 65\% L_1$, $L_2 \leq 60\% L_1$, $L_2 \leq 55\% L_1$, or $L_2 \leq 50\% L_1$. In another aspect, $L_2$ can be ≥25% $L_1$, such as $L_2 \geq 30\% L_1$, $L_2 \geq 35\% L_1$, or $L_2 \geq 40\% L_1$. In another aspect, $L_2$ can be within a range between, and including, any of the percentage values of $L_1$ disclosed above.

FIG. 3, FIG. 4, and FIG. 5 further indicate that the sidewall 304 of the body 302 of the tolerance ring 122 can include a plurality of unformed sections 340. Each unformed section 340 can comprise a section of the sidewall 304 that extends between adjacent wave columns 324 and is not formed with any waves or other structures. Moreover, each unformed section 340 can extend between adjacent wave columns 324 between the upper flange 316 and the lower flange 318 of the body 302 without any additional structure or feature formed between the flanges 316, 318.

As indicated in FIG. 5, the wave columns 324 and the unformed sections 340 can alternate around the circumference of the sidewall 304. Moreover, in a particular aspect, the wave columns 324 are evenly spaced around the circumference of the sidewall 304 by the unformed sections 340 of the sidewall 304.

FIG. 3 and FIG. 5 indicate that the sidewall 304 of the body 302 of the tolerance ring 122 can be formed with a plurality of perforations, or holes 342 that can extend radially through the sidewall 304 of the body 302. In particular, at least one hole 342 can intersecting, or overlap, at least one of the wave structures to establish a perforated wave structure.

Further, in a particular aspect, each hole 342 can be primarily formed in an unformed section 340 between adjacent wave columns 324 and the hole 342 can overlap a portion of wave 322 within an adjacent wave 322. Each hole 342 can overlap a single wave 322 within a single column 324, two waves 322 within a single column 324, two waves 322 each in two different columns 324, or four waves 322 two each in two different columns 324.

In a particular aspect, a center of the hole 342 can be located in one of the unformed sections 340 and a periphery of the hole 342 can overlap the wave 322. As illustrated in FIG. 4, the hole 342 can remove an area of the sidewall 304 of the body 302 that includes the unformed section 340 and at least one wave 322. Further, the hole 342 can be formed in and include an unformed section portion 402 having an area, $A_{US}$, and a wave portion 404, or portions, having an area, $A_W$, and $A_W$ can be $\leq A_{US}$, such as $\leq 25\% A_{US}$, such as $\leq 20\% A_{US}$, $\leq 15\% A_{US}$, or $\leq 10\% A_{US}$. In another aspect, $A_W$ can be $\geq 1\% A_{US}$, such as $\geq 2\% A_{US}$, $\geq 3\% A_{US}$, $\geq 4\% A_{US}$, or $\geq 5\% A_{US}$. In another aspect, $A_W$ can be within a range between, and including, any of the percentage of $A_{US}$ values described herein. In another aspect, a center of the hole 342 can be located in a wave 322 and a periphery of the hole 342 can overlap an unformed section 340.

Removing a portion of the wave 322, or wave structure, results in a perforated wave structure. By removing a portion of the wave 322, the stiffness of the perforated wave can be reduced, or otherwise altered, from the same wave not having a hole 344. In other words, an unperforated wave, or unperforated wave structure, can include a stiffness, S, and after a hole is formed that overlaps the wave 322, the resulting perforated wave can have a stiffness, $S_P$. $S_P$ can be $<S$. For example, $S_P$ can be $\leq 95\% S$, such as $S_P \leq 90\% S$, $S_P \leq 85\% S$, $S_P \leq 80\% S$, $S_P \leq 75\% S$, $S_P \leq 70\% S$, or $S_P \leq 65\% S$. Moreover, $S_P$ can be $\geq 25\% S$, such as $S_P \geq 30\% S$, $S_P \geq 35\% S$, $S_P \geq 40\% S$, $S_P \geq 45\% S$, or $S_P \geq 50\% S$. In another aspect, $S_P$ can be within a range between, and including, any of the percentage of S values described above.

In another aspect, each wave 322, or wave structure, not formed with a hole 342 can include a wave area, A, that includes the surface area of the wave 322. After a hole 342 is formed the surface area of the wave 322 can be reduced and the perforated wave structure can include a perforated wave area, $A_P$. As such, $A_P$ is $<A$. Specifically, $A_P$ can be $\leq 95\% A$, such as $A_P \leq 90\% A$, $A_P \leq 85\% A$, $A_P \leq 80\% A$, $A_P \leq 75\% A$, $A_P \leq 70\% A$, or $A_P \leq 65\% A$. Removing too much of the wave 322 may result in a wave 322 that is not stiff enough to function as a spring and engage the inner surface of a bore in which the tolerance ring 122 is installed. Accordingly, $A_P$ can be $\geq 25\% A$, such as $A_P \geq 30\% A$, $A_P \geq 35\% A$, $A_P \geq 40\% A$, $A_P \geq 45\% A$, or $A_P \geq 50\% A$. In another aspect, $A_P$ can be within a range between, and including, any of the percentage of A values described herein.

In another aspect, a hole 342 can intersect, or overlap, multiple waves 322 or wave structures. Further, the hole 342 can have a shape selected from the group comprising: polygonal, circular, and elliptical.

As depicted in FIG. 3, each wave structure, e.g., each wave 322, can include at least one raised shoulder 344. Specifically, as illustrated, each wave 322 can include four raised shoulders 344 with each raised shoulder 344 located at each corner of the wave 322. Each shoulder 344 can be a crease in the wave 322 that can extend from the outer surface of the sidewall 304 to a center of the wave 322. Two adjacent shoulders 344 can establish a continuous crease along a top or a bottom of the wave 322.

The raised shoulders 344 can result from a stamping operation that can be used to shape and form the tolerance ring 122 before the tolerance ring 122 can be rolled, or otherwise shaped or bent, into a final free state, or uninstalled resting, shape. The raised shoulders 344 can act as a stiffening member, e.g., a rib, and can provide stiffness for the wave 322. In a particular aspect, the hole 342 can intersect, or overlap, the wave structure, or wave 322, in order to remove at least a portion of the shoulder.

Each shoulder 344 can include a shoulder length, $L_S$, measured along the curved surface of the wave 322 from the outer surface of the sidewall 304 to a center line that bisects the wave 322 longitudinally. The hole 342 that intersects the wave 322 can remove a portion of the length of the shoulder 344 such that a removed length, $L_R$, can be $\leq L_S$. In one aspect, $L_R = L_S$. In another aspect, $L_R$ can be $\leq L_S$, such as $\leq 50\% L_S$, $\leq 45\% L_S$, $\leq 40\% L_S$, $\leq 35\% L_S$, $\leq 30\% L_S$, or $\leq 25\% L_S$. In another aspect, $L_R$ can be $\geq 1\% L_S$, such as, $\geq 2\% L_S$, $\geq 3\% L_S$, $\geq 4\% L_S$, $\geq 5\% L_S$, or $\geq 10\% L_S$. Further, $L_R$ can be within a range between, and including, any of the percentage of $L_S$ values described above.

In another aspect, as illustrated in FIG. 5, each unformed section 340 of the sidewall 304 can include an arc, e.g., an arc that extends along the circumference of the sidewall 304 through the unformed sections 340, and a portion of each hole 342 formed in the sidewall 304 can lie radially outward beyond the arc of the unformed section 340. In other words, each hole 342 formed in the sidewall 304 through an unformed section 340 and a wave structure, e.g., a wave 322, will have a first portion that lies along, or corresponds to, the curvature of the unformed section 340 and a second portion that lies along, or corresponds to, the curvature of the wave structure, or wave 322.

FIG. 5 indicates that the tolerance ring 122 can include a central axis 350 that can pass through a center 352 of the tolerance ring 122 and bisect the gap 314. In a particular aspect, the tolerance ring 122 can be symmetric about the central axis 350.

In a particular aspect, when the pivot assembly 104 is installed within the bore 116 of the actuator arm with the tolerance ring 122 disposed there between, the pivot 120 and the bore 116 can include a central axis that lies along, or nearly along, the central axis 320 of the tolerance ring 122. The tolerance ring 122 can provide a radial stiffness that can substantially resist radial movement of the pivot 120 within the bore 116 of the actuator arm 102 in various directions.

When left unconstrained, movement of the pivot 120 within the bore can cause the read/write heads 114 to move with respect to a hard disk which can result in read/write errors. This movement is undesired. By modifying the wave structures as described herein, the radial stiffness of the tolerance ring 122 can be manipulated, or tuned, to substantially reduce any reduction in radial stiffness caused by the gap 314. Further, by modifying the wave structures, the radial stiffness of the tolerance ring 122 can be manipulated, or tuned, so that the radial stiffness of the tolerance ring 122 does not vary too greatly when measured at various locations circumferentially around the tolerance ring 122.

For example, the radial stiffness of the tolerance ring 122 through the gap 314, $RS_G$, can be measured in a first direction that passes through the gap 314 and a center 360 of the tolerance ring 122. The radial stiffness of the tolerance ring 122 perpendicular to the gap 314, $RS_{PG}$, can be measured in a second direction perpendicular to the first direction. $RS_G$ can be ≥90% $RS_{PG}$, such as ≥91% $RS_{PG}$, ≥92% $RS_{PG}$, ≥93% $RS_{PG}$, ≥94% $RS_{PG}$, ≥95% $RS_{PG}$, or ≥96% $RS_{PG}$ Further, $RS_G$ can be ≤100% $RS_{PG}$, ≤99% $RS_{PG}$, ≤98% $RS_{PG}$, or ≤97% $AS_{PG}$. Moreover, $RS_G$ can be within a range between, and including, any of the percentage values of $RS_{PG}$ disclosed above.

Additionally, the resonant frequency of the tolerance ring 122 does not vary greatly when measured at various locations circumferentially the assembly in which the tolerance ring 122 is installed. For example, the resonant frequency of the tolerance ring 122 through the gap 314, $RF_G$, can be measured in a first direction that passes through the gap 314 and the center 360 of the tolerance ring 122. The resonant frequency of the tolerance ring 122 perpendicular to the gap 314, $RF_{PG}$, can be measured in a second direction perpendicular to the first direction. $RF_G$ can be ≥90% $RF_{PG}$, such as ≥91% $RF_{PG}$, ≥92% $RF_{PG}$, ≥93% $RF_{PG}$, ≥94% $RF_{PG}$, or ≥95% $RF_{PG}$. Further, $RF_G$ can be ≤100% $RF_{PG}$, ≤99% $RF_{PG}$, ≤98% $RF_{PG}$, ≤97% $RF_{PG}$, or ≤96% $RF_{PG}$. Moreover, $RF_G$ can be within a range between, and including, any of the percentage values of $RF_{PG}$ disclosed above.

Figure 6:
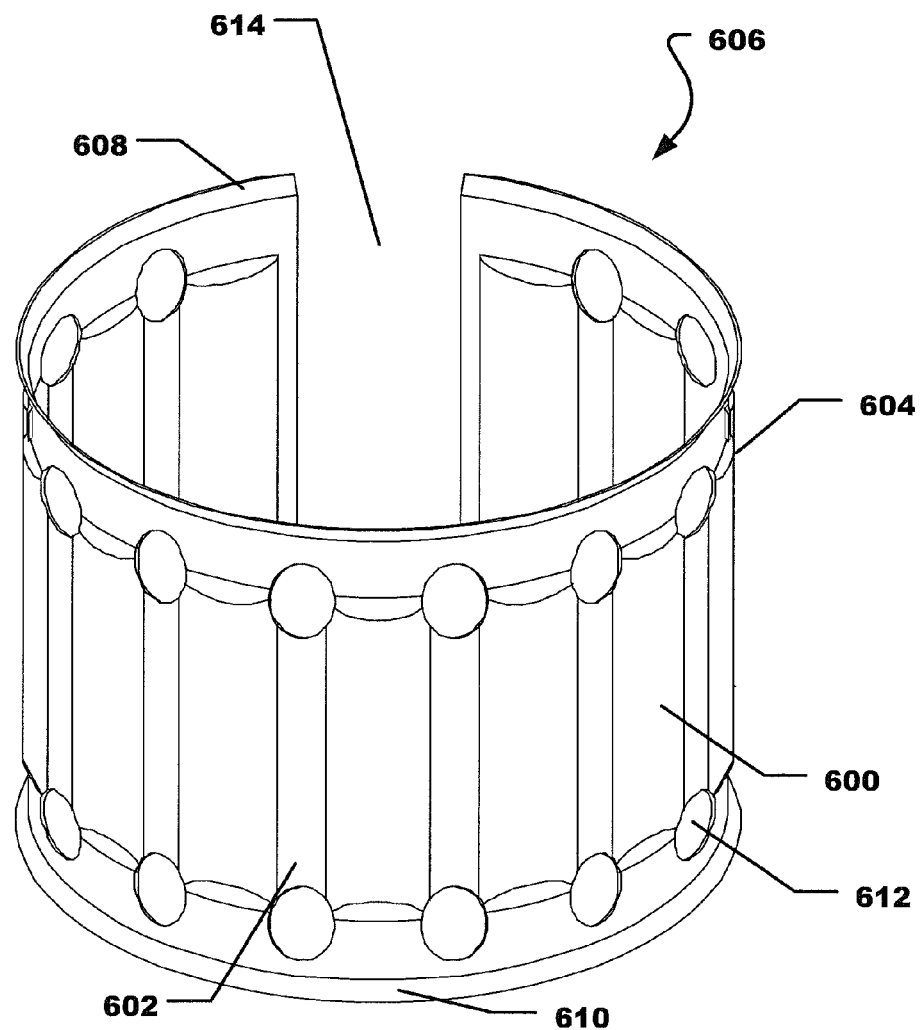
FIG. 6 includes a perspective view of a tolerance ring in accordance with another embodiment.

Referring now to FIG. 6, in another aspect, each wave structure can include a single elongated wave 600. The elongated waves 600 can extend longitudinally along a sidewall 602 of a body 604 of a tolerance ring 606. Further, each elongated wave 600 can extend substantially along a length of the sidewall 602 of the tolerance ring 606 between an upper flange 608 and a lower flange 610. The tolerance ring 606 can also include a gap 614. In this aspect, each elongated wave 600 can be centered along the length of the tolerance ring 600. Moreover, this aspect of the tolerance ring 600 can include one or more of the features or characteristics described herein with respect to the other tolerance rings disclosed herein.

In this aspect, a plurality of holes 612 can be formed in the sidewall 602 of the tolerance ring 606. In one aspect, each hole 612 can intersect a bottom corner of a single elongated wave 600. In another aspect, each hole 612 can intersect a bottom corner of a first elongated wave 600 and a bottom corner of a second elongated wave 600. In another aspect, a first hole 612 can intersect one elongated wave 600 and a second hole 612 can intersect the same elongated wave 600.

Further, as shown in FIG. 6, first hole 612 can intersect a pair of adjacent elongated waves 600 and a second hole 612 can intersect the same pair of elongated waves 600. As illustrated, the first hole 612 can intersect a bottom corner of a first elongated wave 600 and a bottom corner of a second elongated wave 600 and the second hole 612 can intersect a top corner of the first elongated wave 600 and the top corner of a second elongated wave 600.

In each embodiment described herein, two wave structures, e.g., elongated waves, wave columns, or a combination thereof, will always be located circumferentially closer to a gap 314, 614 than the remaining wave structures. The two wave structures adjacent to the gap 314, 614, i.e., the two wave structures closest to the gap 314 can include a first wave stiffness, $SW_1$. The other wave structures that are adjacent to unformed sections can include a second wave stiffness, $SW_2$. Without modification of the tolerance ring 122, 600, and with similarly sized and shaped waved structures on the tolerance ring 122, 600, $SW_1$ can be ≤$SW_2$.

However, modifying the wave structures 322, 600, by changing one or dimensions of the wave structures 322, 600 or by perforating the wave structures 322, 600 with one or more holes 342, 612, the stiffness of the waves can be manipulated as described herein. Accordingly, holes 342, 612 formed in the sidewall 304, 604 that are circumferentially closer to the gap 314, 614 can be different sized, different shaped, or different sized and shaped, than holes 342, 612 formed in the sidewall 304, 604 that are circumferentially further from the gap 314, 614. In particular, the holes 322, 600 can increase in size along the circumference of the sidewall 304, 604 from the gap 314, 614 to a location along the circumference of the sidewall 304, 604 furthest from the gap 314, 614 (i.e., 180° from the gap 314, 614).

In a particular aspect, a tolerance ring according to any of the aspects described herein can be made from a metal, a metal alloy, or a combination thereof. The metal can include a ferrous metal. Further, the metal can include steel. The steel can include stainless steel, such as austenitic stainless steel. Moreover, the steel can include stainless steel comprising chrome, nickel, or a combination thereof. For example, the steel can X10CrNi18-8 stainless steel. Further, the tolerance ring can include a Vickers pyramid number hardness, VPN, which can be ≥350, such as ≥375, ≥400, ≥425, or ≥450. VPN can also be ≤500, ≤475, or ≤450. VPN can also be within a range between, and including, any of the VPN values described herein. In another aspect, the tolerance ring can be treated to increase its corrosion resistance. In particular, the tolerance ring can be passivated. For example, the tolerance ring can be passivated according to the ASTM standard A967.

In another aspect, the stock material from which the tolerance ring can be formed can have a thickness, t, and t can be ≥0.085 mm, such as ≥0.087 mm, ≥0.090 mm, ≥0.095 mm, or ≥0.100 mm. In another aspect, t can be ≤0.115 mm, ≤0.113 mm, ≤0.110 mm, or ≤0.105 mm. Moreover, t can be within a range between, and including, any of the values of t disclosed above.

The tolerance ring according to any of the aspects described herein may have an overall outer diameter, OD, and OD can be ≥5 mm, such as ≥6 mm, ≥7 mm, ≥8 mm, ≥9 mm, or ≥10 mm. The OD can be ≤20 mm, such as ≤15 mm, ≤14 mm, ≤13 mm, ≤12 mm, or ≤10 mm. Further, OD can be within a range between and including any of the values of OD described herein.

In another aspect, the tolerance ring can have an overall length, L, and L can be ≤20 mm, such as ≤17 mm, ≤15 mm, ≤14 mm, or ≤13 mm. L can be ≥5 mm, ≥6 mm, ≥7 mm, ≥8 mm, ≥9 mm, or ≥10 mm. Moreover, L can be within a range between, and including, any of the values of L described above.

Additionally, after the stock material that is used to form any of the tolerance rings described herein is cut, stamped, and rolled to form the tolerance ring, the resulting tolerance ring is substantially free of any burrs. Specifically, no burrs are visible along any of the cut edges under a visual inspection of the tolerance ring under 10× magnification.

Example

A tolerance ring is manufactured from X10CrNi18-8 stainless steel stock. The stainless steel stock has a thickness of 0.1 mm±0.013. Further, the stainless steel stock has a VPN of 400-450 and is passivated to ASTM A967. The formed tolerance ring includes thirteen wave columns equally spaced around the circumference of the sidewall. The distance between the centers of each adjacent pair of wave columns along the circumference of the sidewall is approximately 2.62 mm.

Each wave column includes three waves that are vertically aligned. The upper wave and the lower wave are approximately 1.66 mm wide and 3.0 mm tall. The middle wave is approximately 1.66 mm wide and 1.5 mm tall. The tolerance ring has an overall wall thickness after installation of about 0.3 mm. Further, the tolerance ring has an overall free-state diameter of approximately 11.5 mm and an overall length of approximately 12.5 mm.

The tolerance ring includes twenty-four holes formed radially through the sidewall. Specifically, twelve holes are formed in the upper row of waves and twelve are formed in the lower row of waves. Each hole has a diameter of approximately 1.2 mm and each hole is centered between adjacent waves along a line connecting the corners of the waves.

The tolerance ring is installed around a post having an outer diameter of 11.135 mm and this assembly is installed within a ring having a bore of approximately 11.722 mm. This assembly is suspended using fishing line and a laser is placed perpendicular to an outer cylindrical surface of the ring.

Figure 7:
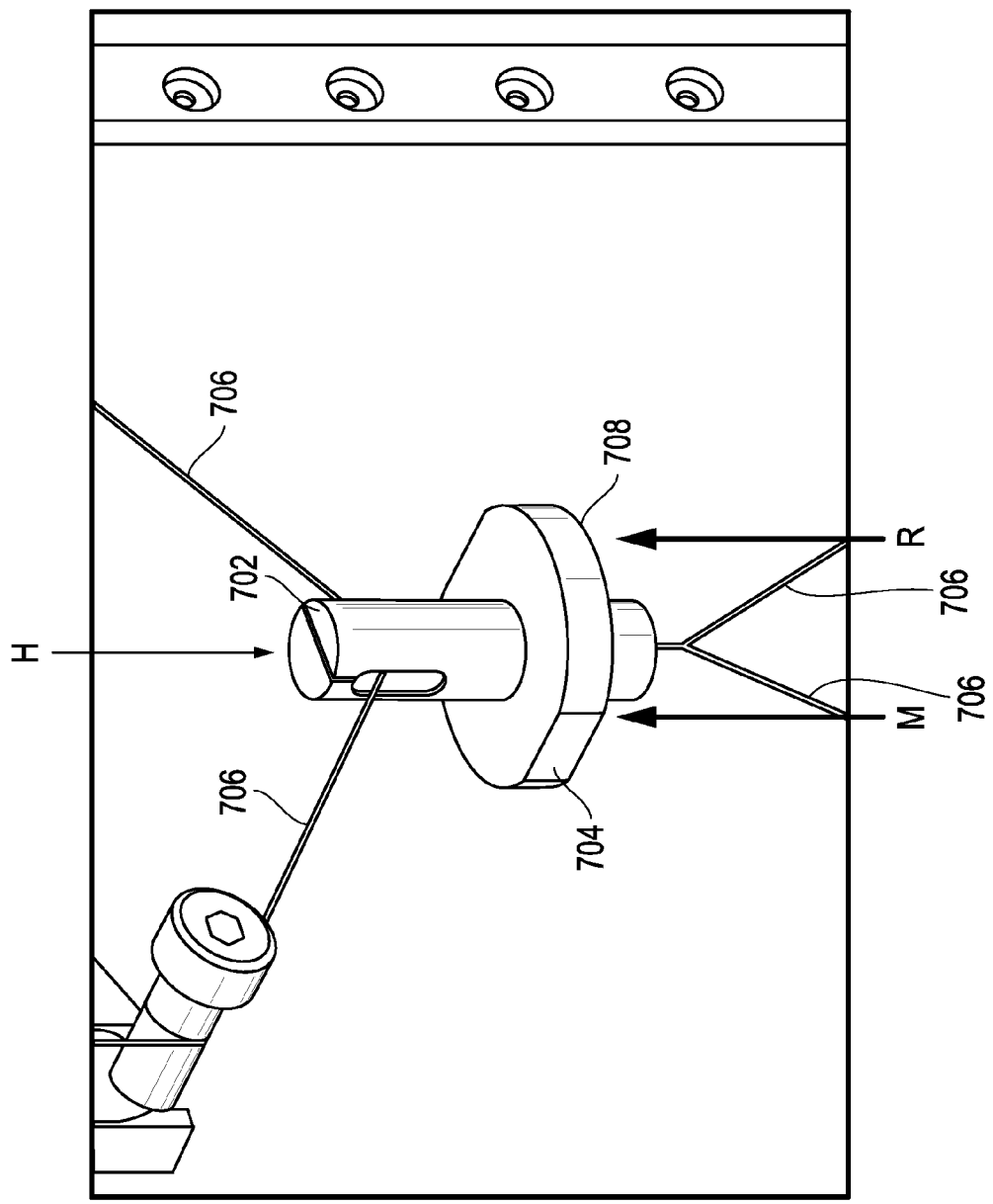
FIG. 7 includes a Hammer Test setup for testing on-axis axial stiffness.

FIG. 7 depicts a Hammer Test setup for on-axis axial stiffness testing. The tolerance ring is installed around a post 702 having an outer diameter of 11.135 mm and this assembly is installed within a ring 704 having a bore of approximately 11.722 mm. This assembly is suspended using fishing lines 706 and two lasers are placed perpendicular to a flat face of the ring 708 on the same side of the ring. The lasers are placed 180 degrees from each other. One laser is used as a reference laser R and the other laser is used as a measurement laser M. The post is tapped on-axis from the side opposite of the lasers as indicated by the arrow labeled H. The lasers and the force transducer of the hammer are coupled to a microprocessor and provide inputs to the microprocessor.

Figure 8A:
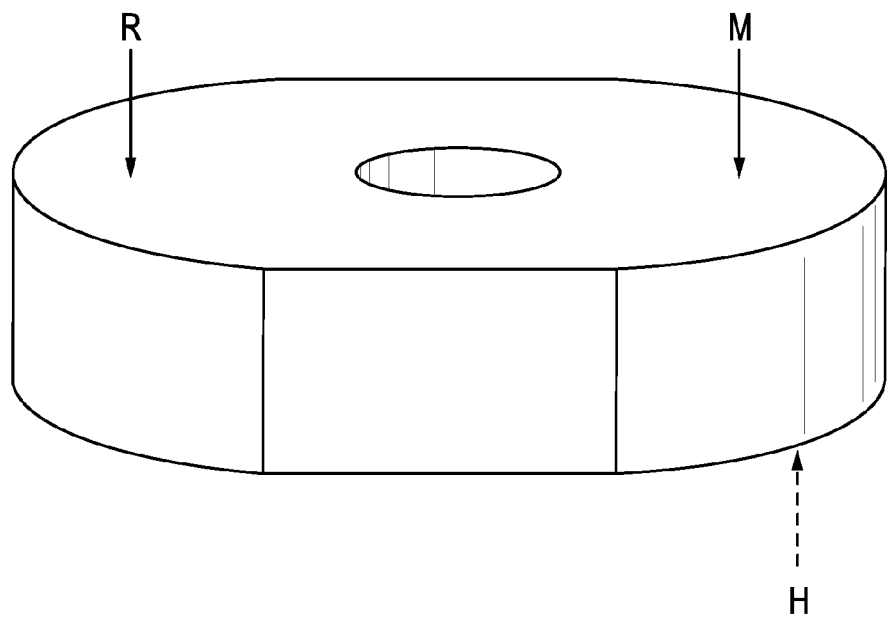
FIGS. 8A and 8B illustrate a Hammer Test for testing off-axial stiffness.
Figure 8B:
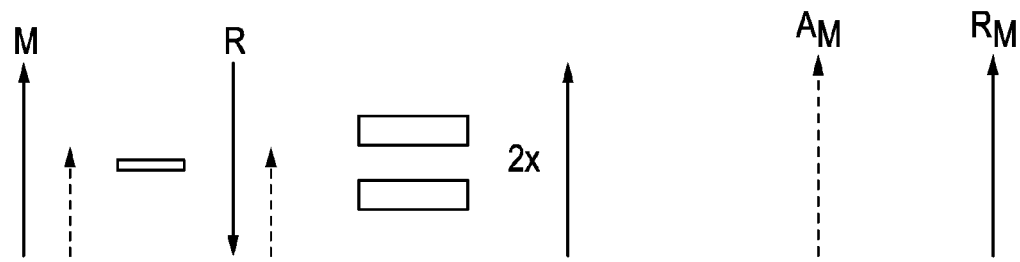

FIG. 8A illustrates the Hammer Test setup for off-axis axial stiffness testing. The tolerance ring is installed around a post having and within a ring as shown in FIG. 7 and suspended using fishing lines. As in FIG. 7, two lasers are placed perpendicular to a flat face of the ring on the same side of the ring. The lasers are placed 180 degrees from each other. One laser is used as a reference laser and the other laser is used as a measurement laser. The ring is tapped off-axis under the measurement laser using a hammer as indicated by the arrow labeled H that has a force transducer incorporated therein. The lasers and the force transducer of the hammer are coupled to a microprocessor and provide inputs to the microprocessor. FIG. 8B illustrates how the input is processed to compensate for the rocking mode $R_M$ and axial mode $A_M$ induced by the off-axis tap.

Figure 9A:
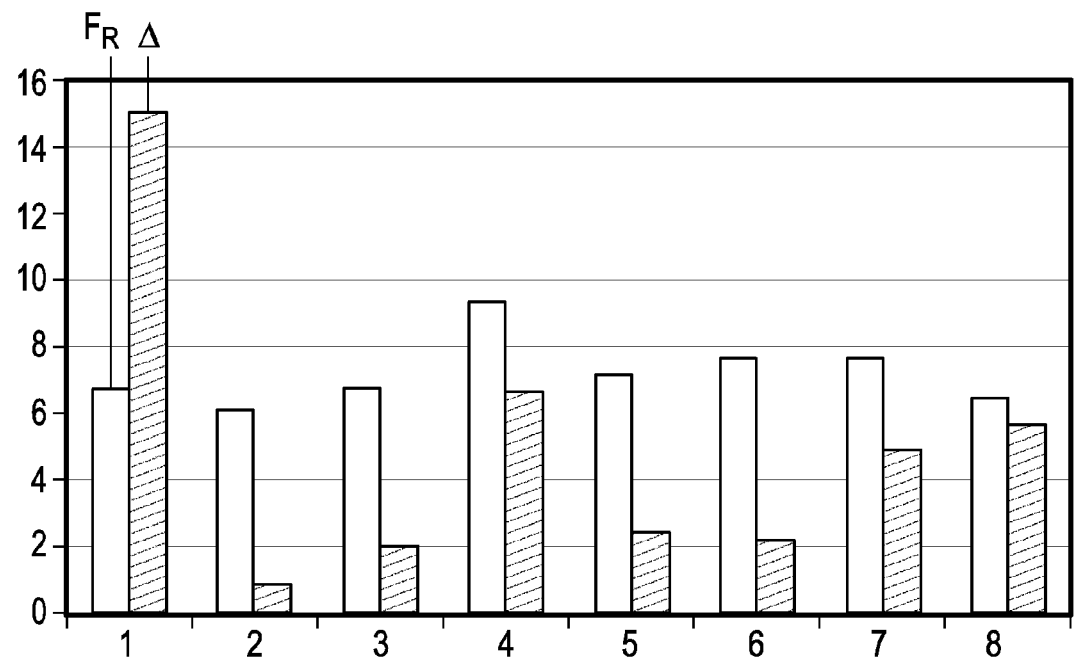
FIGS. 9A and 9B include the test results of on- and off-axis axial stiffness for various tolerance rings.
Figure 9B:
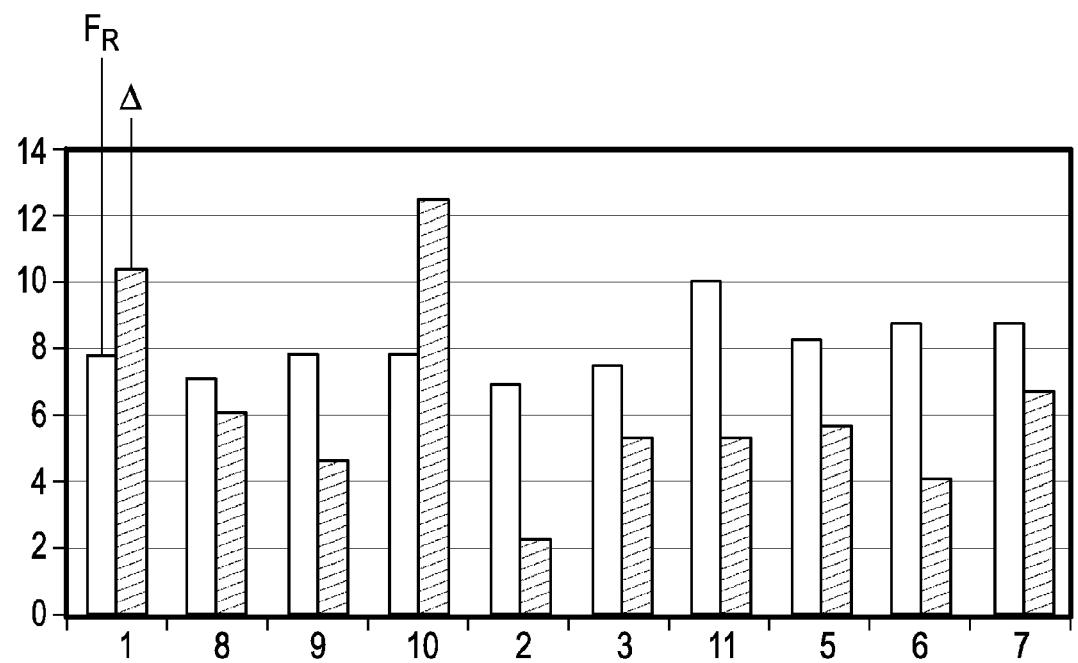

FIGS. 9A and 9B display the test results of on-axis and off-axis axial stiffness for various tolerance ring. In FIGS. 9A and 9B, the columns have the following designations. The $F_R$ provides the average resonant frequency in kHz of the ring; the A is the determined average percent difference around ring.

| | |
|---|---|
| 1 | Comparison A Tolerance Ring |
| 2 | eight wave quad ring |
| 3 | twelve wave quad ring |
| 4 | Double band Comp. ring |
| 5 | six wave pitch corrected |
| 6 | seven wave pitch corrected |
| 7 | eight wave pitch corrected |
| 8 | Comparison B Tolerance Ring |
| 9 | plannish (unformed) opposite gap |
| 10 | Center wave opposite gap |
| 11 | Ring with slits |

Ring 1 is a comparison ring being a 13 wave hard disc drive tolerance ring with three bands. Ring 2 is an eight wave ring in 4 groups. Ring 3 is a twelve waves tolerance ring in four groups. Ring 4 is similar to ring 1 but includes a double band. Ring 5 has six wave that are pitch corrected. Pitch corrected rings have waves distributed around the assembly with equal angular spacing. Rings 6 and 7 have a seven wave and eight wave pitch corrected arrangement, respectively. Ring 8 is a second comparison ring made from a new assembly batch having a 13 wave three band arrangement. Ring 9 has an unformed ("plannish") region opposite gap. Ring 10 has a centered wave opposite gap. Ring 11 is a 12 wave pitch corrected ring having slits located between waves. The slits have a length substantially to the length of the wave columns.

The radial stiffness of the ring in a dummy assembly is measured using a hammer test in 2 places; at the gap and at 90 degrees to the gap. The % difference is calculated between the average of 5 rings tested with 5 hits at each place. Since the tests were carried out with the same dummy masses, the resonant frequency is reported rather than the stiffness for ease of calculation, Equation 1.

The radial stiffness of the ring in a dummy assembly is measured using a hammer test in 2 places; at the gap and at 90 degrees to the gap. The % difference is calculated between the average of 5 rings tested with 5 hits at each place. Since the tests were carried out with the same dummy masses, the resonant frequency is reported rather than the stiffness for ease of calculation, Equation 1.

$$f = \frac{1}{2\pi}\sqrt{\frac{k}{m}}, \quad \text{(Eq. 1)}$$

wherein f is the resonant frequency, m is the effective mass, and k is the stiffness of the test piece.

Figure 10:
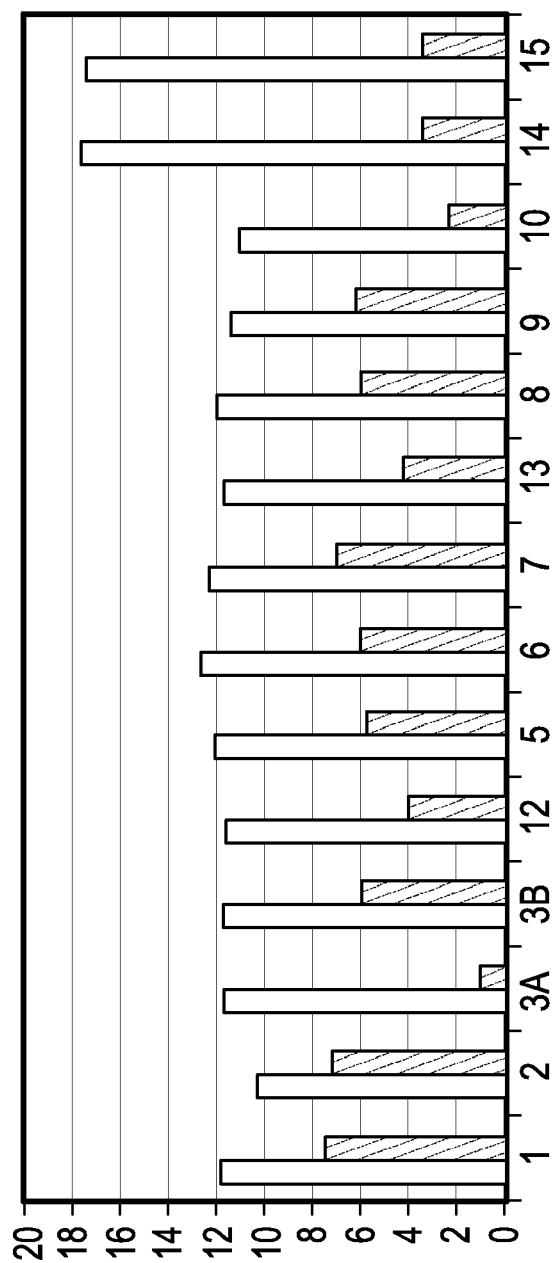
FIG. 10 includes the test results of radial stiffness for various tolerance rings.

FIG. 10 depicts the test results of radial stiffness testing for various tolerance ring. In FIG. 10, the columns have the same designations as in FIGS. 9A and 9B and as disclosed below. The $F_R$ provides the average resonant frequency in kHz of the ring; the A is the determined average percent difference around ring.

| | |
|---|---|
| 3A | 12 wave quad ring 40 lbf PAF |
| 3B | 12 wave quad ring 30 lbf PAF |
| 12 | Ring w/ holes |
| 13 | eleven wave pitch corrected |
| 14 | Ring housing variable |
| 15 | Ring with closed housing variable |

Ring 2A has a 40 lbf remaining assembly force. Ring 3B has 30 lbf remaining assembly force. Ring 12 is a 12 wave pitch corrected ring having holes between wave column, more specifically two holes between two waves. Ring 13 is an eleven wave pitch corrected. Ring 14 is a ring with housing variable, i.e. the ring can be squeezed to conform to a central bore. Ring 15 is a ring whit closed housing variable, i.e., the ring is smaller in diameter than its bore and can be stretched to conform to the bore.

For Peak assembly and initial slip testing, first the torque of a pivot is tested. The pivot is then assembled into an arm using the relevant tolerance ring and the peak assembly force (PAF) is recorded. The torque of the assembly is then tested and the difference between unassembled and assembled torque, or 'torque shift' is recorded. Next, the assembly is disassembled, and the initial slip is recorded and finally, the torque of the pivot is measured again. The pivot is re used until the post-assembled torque is considered high, or 5 times, whichever occurs first. The arm is re-used 5 times. These reusage policies are the result of previous investigation and shouldn't cause any problems, but it should be borne in mind that the pivot and arm are not virgin each time.

Figure 11:
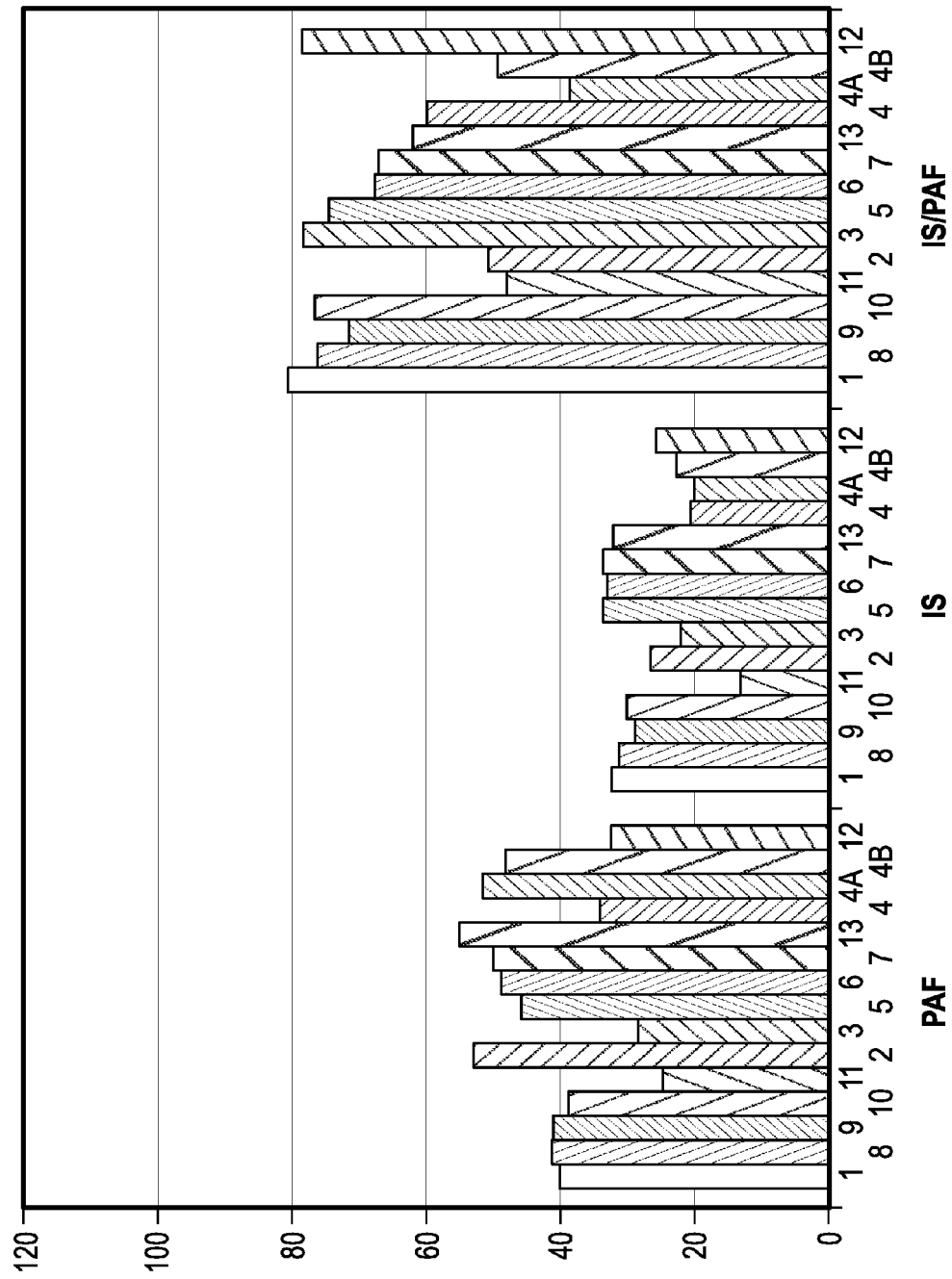
FIG. 11 includes test results for Peak Assembly Force (PAF), Initial Slip (IS), and ratio of IS/PAF for various tolerance rings.

FIG. 11 depicts the test results of PAF, IS, and IS/PAF testing for various tolerance ring. In FIG. 11, the columns have the same designations as in FIGS. 9A, 9B, and 10. PAF and IS are in lbf and IS/PAF is in %

The microprocessor includes software that calculates resonant frequencies from the inputs provided by the hammer and the lasers. The resonant frequency is directly related to the axial stiffness of the tolerance ring. The resonant frequency measured along an axis that bisects the gap and passes through a center of the assembly is about 6.65 kHz. The resonant frequency measured along an axis perpendicular to the first axis is about 6.8 kHz which is a difference of about 2.2%. As such, the axial stiffness through the gap, $AS_G$, is about 97.8% of the axial stiffness perpendicular to the gap, $AS_{PG}$.

The ring is tapped opposite the laser using a hammer that has a force transducer incorporated therein. The laser and the force transducer of the hammer are coupled to a microprocessor and provide inputs to the microprocessor. The microprocessor includes software that calculates resonant frequencies from the inputs provided by the hammer and the laser. The resonant frequency is directly related to the radial stiffness of the tolerance ring. The resonant frequency measured along an axis that bisects the gap and passes through a center of the assembly is about 11.29 kHz. The resonant frequency measured along an axis perpendicular to the first axis is about 11.74 kHz which is a difference of about 3.8%. As such, the radial stiffness measured through the gap, $RS_G$, is about 96.2% of the radial stiffness perpendicular to the gap, $RS_{PG}$.

The tolerance rings described herein include perforated waves. The perforated waves can provide a tolerance ring having a resonant frequency and stiffness that do not substantially vary circumferentially around the tolerance ring. As such, the tolerance ring can maintain the post in alignment within the bore and can substantially prevent any rocking of the post within the bore under normal operational loads in nearly any radial direction.

Moreover, by changing the size and location of each hole, the performance characteristics of the tolerance ring can be adjusted, or tuned, to meet certain requirements of a particular assembly. For example, the holes can be arranged to provide a particular radial stiffness, or axial stiffness, in one direction and a different radial stiffness, or axial stiffness, in another direction.

A skilled artisan can recognize that there may be others applications that can utilize a tolerance ring having one or more of the characteristics described herein.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

What is claimed is:

1. A tolerance ring, comprising:
   a generally cylindrical body having a side wall that defines a top, and a bottom, wherein the side wall includes:
   a plurality of wave structures, each wave structure defining an outer perimeter;
   a plurality of unformed sections, wherein each unformed section is located between a pair of adjacent wave structures, and wherein the plurality of wave structures extend from the unformed sections such that at least half of the perimeter of each wave structure is contiguous with adjacent unformed sections;
   a gap extending along the entire length of the body, wherein the gap establishes a split in the body; and
   at least one hole having a closed periphery overlapping at least one of the wave structures and at least one of the adjacent unformed sections to establish a perforated wave structure.

2. The tolerance ring of claim 1, wherein a center of the at least one hole is located in the at least one of the adjacent unformed sections.

3. The tolerance ring of claim 1, wherein the at least one hole removes an area of material from the at least one adjacent unformed portion, Aup, and an area of material from the at least one wave portion, Aw, wherein Aw<=Aup.

4. The tolerance ring of claim 3, wherein $A_W \geq 1\% A_{UP}$.

5. The tolerance ring of claim 1, wherein at least 75% of the perimeter of each wave structure is contiguous with the sidewall.

6. The tolerance ring of claim 1, wherein each wave structure includes a stiffness, S, and the perforated wave structure includes a perforated stiffness, $S_P$, wherein $S_P < S$.

7. The tolerance ring of claim 1, wherein each wave structure includes a wave area, A, and the perforated wave structure includes a perforated wave area, $A_P$, wherein $A_P < A$.

8. The tolerance ring of claim 1, wherein the at least one hole intersects multiple wave structures.

9. The tolerance ring of claim 1, wherein the at least one hole has a shape selected from the group comprising: polygonal, circular, and elliptical.

10. The tolerance ring of claim 1, wherein each wave structure includes at least one raised shoulder and the at least one hole intersects the wave structure to removes a portion of the shoulder.

11. The tolerance ring of claim 1, wherein the at least one unformed section comprises an arc and a portion of the at least one hole lies radially beyond the arc of the unformed section.

12. The tolerance ring of claim 1, wherein each wave structure includes an elongated wave extending from the sidewall and extending substantially along a length of the sidewall.

13. The tolerance ring of claim 12, wherein the at least one hole intersects a bottom corner of a single elongated wave.

14. The tolerance ring of claim 12, wherein the at least one hole intersects a bottom corner of a first elongated wave and a bottom corner of a second elongated wave.

15. The tolerance ring of claim 12, wherein the at least one hole includes a first hole intersecting one elongated wave and a second hole intersecting the same elongated wave.

16. The tolerance ring of claim 12, wherein the at least one hole includes a first hole intersecting a pair of adjacent elongated waves and a second hole intersecting the same pair of elongated waves.

17. The tolerance ring of claim 1, wherein the tolerance ring includes an assembly force, $F_A$, to install the tolerance ring in a bore and a disassembly force, $F_D$, to remove the tolerance ring from the bore, wherein $F_D \geq 75\% F_A$, $F_D \geq 80\% F_A$, $F_D \geq 85\% F_A$, or $F_D \geq 90\% F_A$.

18. The tolerance ring of claim 17, wherein $F_D \leq 100\% F_A$, $F_D \geq 99\% F_A$, $F_D \geq 98\% F_A$, $F_D \geq 97\% F_A$, $F_D \geq 96\% F_A$, or $F_D \geq 95\% F_A$.

19. An assembly, comprising:
an outer component including a bore within the outer component;
an inner component disposed within the bore; and
a tolerance ring mounted on the inner component, the tolerance ring comprising:
a generally cylindrical body having a side wall that defines a top, and a bottom,
wherein the side wall includes:
a plurality of wave structures, each wave structure defining a perimeter, the perimeter defining a first location, a second location opposite the first location, a third location, and a fourth location opposite the third location;
a plurality of unformed sections, wherein each unformed section is located between a pair of adjacent wave structures, and wherein the plurality of wave structures extend from the unformed sections such that each of the first, second, third, and fourth locations contact the sidewall;
a gap extending along the entire length of the body, wherein the gap establishes a split in the body; and
at least one hole having a closed periphery overlapping at least one of the wave structures and at least one of the adjacent unformed sections to establish a perforated wave structure.

20. A hard disk drive, comprising:
an actuator arm formed with a bore;
a pivot assembly installed within the bore of the actuator the arm, the pivot assembly including a post and a tolerance ring around the post, wherein the tolerance ring includes:
a generally cylindrical body having a side wall that defines a top, and a bottom, wherein the side wall includes:
a plurality of wave structures, each wave structure defining an axial height;
a plurality of unformed sections, wherein each unformed section is located between a pair of adjacent wave structures, and wherein the plurality of wave structures extend from the unformed sections;
a gap extending along the entire length of the body, wherein the gap establishes a split in the body; and
at least one hole having a closed periphery overlapping at least one of the wave structures and at least one of the adjacent unformed sections to establish a perforated wave structure,
wherein the at least one hole defines a diameter less than the axial height of the wave structures.

* * * * *